United States Patent [19]

Poitevin

[11] 4,200,838

[45] Apr. 29, 1980

[54] APPARATUS FOR EVALUATING THE ERROR RATE OF BINARY DIGITAL SIGNALS

[76] Inventor: Jean-Pierre R. Poitevin, 53, rue Denis-Gogue, 92140 Clamart, France

[21] Appl. No.: 900,978

[22] Filed: Apr. 28, 1978

[30] Foreign Application Priority Data

May 6, 1977 [FR] France .............................. 77 14475

[51] Int. Cl.² .............................................. H04J 3/14
[52] U.S. Cl. ..................................... 371/22; 371/68; 371/69
[58] Field of Search ............... 325/41, 67; 179/15 BF, 179/175.2 C; 340/146.1 R, 146.1 E, 146.1 AV, 146.1 BE, 146.2

[56] References Cited

U.S. PATENT DOCUMENTS

| | | | |
|---|---|---|---|
| 4,064,459 | 12/1977 | Markwitz | 325/41 |
| 4,091,240 | 5/1978 | Lainey | 325/41 |

OTHER PUBLICATIONS

A Bit Error Rate Monitor for Digital PSK Links, Leon et al., IEEE Transactions on Communications, vol. COM-23, #5, May, 1975.
Performance Monitor Techniques for Digital Receivers Based on Extrapolation of Error Rate, Gooding, IEEE Transactions on Communications, vol. COM-16, #3, Jun. 1968.

Primary Examiner—Robert L. Griffin
Assistant Examiner—Michael A. Masinick
Attorney, Agent, or Firm—Laff, Whitesel & Rockman

[57] ABSTRACT

Apparatus for evaluating the error rate of a binary digital signal transmitted according to a multiple level modulation process in which a received signal is connected to a main and an auxiliary demodulator in parallel, the auxiliary modulator including means to disturb the signal, the output from the main demodulator being applied to a comparator to provide a first signal according to the comparison of a first signal pattern with a second signal pattern and the auxiliary demodulator including a comparator whose output provides a second signal according to the state of modulation of first and second received signals, the first and second signals being applied to a modulo 2 adder whose output is applied to a counter.

2 Claims, 5 Drawing Figures

APPARATUS FOR EVALUATING THE ERROR RATE OF BINARY DIGITAL SIGNALS

The present invention relates to apparatus for the evaluation of the error rate in bits transmitted in accordance with a multiple level relation process in a digital link. Evaluation is carried out during normal operation of the link.

For a considerable time, only the quality of the link has been evaluated by transmitting sequences of known bits, although this has the disadvantage of interrupting the service during transmission of the said sequences. Alternatively, redundant blocks of bits may be used in normal operation, but if the TEEB or error rate in the bits is low, measurement is slow and only gives an average result over a long period during which sharp fluctuations may have occurred.

In practice, it would be of value to know the quality of a digital link almost immediately. For this reason, studies have been devoted to this subject. Examples will be quoted of studies described in a technical article which appeared in the American review "IEEE Transactions on Communication Technology", Vol. COM—16 No. 3, June 1968, byD. J. Gooding and entitled "Performance Monitor Techniques for Digital Receivers Based on Extrapolation of Error Rate", and in the technical article which appeared in the American review "IEEE Transactions on Communications", Vol. COM—23, No. 5, May 1975, by B. J. Leon and others, and entitled "A Bit Error Rate Monitor for Digital PSK Links". In the first of the two above mentioned articles, a study is made of an extrapolation technique by using the concept of "pseudo errors". In the second of these two articles, theoretical aspects of this extrapolation technique are developed. In U.S. Pat. Ser. No. 777,739 (now U.S. Pat. No. 4,091,240) corresponding to French Patent Application No. 76 08 288, filed on Mar. 17, 1976 by Messrs. Lainey Gilbert & Duponteil Daniel, entitled "Apparatus for Measurement of the Bit Error Rate in a Digital Link", apparatus was described which included two demodulators, whose inputs are linked in parallel to the receiving end of the link. The two demodulators were of identical structure, but one of them was correctly regulated, whereas the second was disturbed so as to obtain pseudo errors. The outputs of the two demodulators are coupled at the inputs to a modulo 2 adder whose output is coupled to counter, which registers the measurement of the evaluation required. The second demodulator may be disturbed by including at the input, for example, a non-optimal filter, an addition of noise or of a static carrier, a staggering of the clock, or of the regeneration thresholds etc.

It must be noted that in the apparatus in the above mentioned patent application, the modulo 2 adder carries out, in reality, the bit by bit comparison of the signals emitted respectively by the first demodulator or main demodulator and the second demodulator or auxiliary demodulator.

These devices already provide a substantial improvement in the evaluation of bit error rate, as they allow evaluation to be performed without disturbing the operation of the digital link. However, when one considers the links transmitting digital information in multiple level modulation, the main demodulator becomes complex and therefore expensive, and the addition of an auxiliary demodulator of identical structure to the main demodulator, then signifies a notable increase in the cost of the equipment. It should be remembered that, by digital transmission system with multiple level modulation, we mean systems allowing transmission of digital information whose successive values may each have a value among M possible values by making a state or a change of state represented by the amplitude and/or the phase of a carrier, which may take N different states, N of course being greater than or equal to M, correspond to each value.

In particular, binary information may be transmitted in two possible states, by regrouping the successive bits in patterns of n bits and by making the value of each pattern in $2^n$ possible states correspond to a state or change of state of a carrier, whose amplitude and/or phase may define $2^n$ different states. It is thus that standard phase jump systems are known under the name of phase modulation systems in two states or MDP 2 (corresponding in Anglo-Saxon literature to the 2 PSK system), in 2 states or MDP 4 (or 4 PSK), in 8 states or MDP 8 (or 8 PSK) etc., or alternatively, amplitude jump systems in 2, 4, 8, . . . states, or finally hybrid modulation systems with phase and amplitude jumps, such as the known modulation system QAM. In these standard systems, if T is the duration of 1 bit and n the number of bits in a pattern, the duration of a modulation state is nT.

In the multiple level modulation system with staggered jumps described in the French Patent Application No. 77 11008, filed on 6th April 1977, by the present Applicants, a series of bits modulates a carrier so that each bit, depending on its value 1 or 0, modifies or not (or vice versa) the phase and amplitude state defined by the bits which precede it from the phase or amplitude jump representing its contribution. This contribution may be defined directly or according to a coding by transition. However, in the same patent application, the case of mixed modulation, that is of standard and of staggered jumps, was provided for, in which a pattern is divided into successive sub-patterns, the bits belonging to a sub-pattern being modulated in a standard way by simultaneously making their respective contributions, whereas the contributions of each sub-pattern are staggered. For obvious reasons the number m of bits in a sub-pattern is a simple sub-multiple of the number n of bits in the pattern, at least in the majority of cases, which in turn means that the sub-patterns are all of the same length. In the following, this will be assumed to be the case and the term "pattern" will designate either a standard multiple level modulation pattern, or a staggered jump multiple level modulation pattern. Therefore, in the following only patterns with m bits will be considered.

One object of the present invention consists in using TEEB (error rate) evaluation apparatus incorporating, as in the French Patent Application No. 76 08288 already mentioned, a main demodulator and auxiliary demodulator, whose output signals are compared, but in which the structure of the auxiliary demodulator is very much simplified in relation to the main demodulator. This enables a considerable reduction in the cost of the apparatus to be made, particularly in the case of the digital transmission systems with modulation at several multiple levels.

According to a further feature of the invention, the evaluation apparatus for the error rate in bits transmitted according to a multiple level modulation process in a digital link, incorporating a main demodulator and an auxiliary demodulator is provided for, which have their inputs linked in parallel to the receiving end of the link. The strengh of the signal emitted by the link is distributed in predetermined portions between the inputs of the main and auxiliary demodulators. The main demodulator is correctly regulated whilst the auxiliary demodulator is, if necessary, disturbed. The output of the main demodulator is connected, as well as to the signal output, to the input of a comparison circuit which compares the m bits of one pattern to the m bits of the preceding pattern, which emits a signal 1 (or 0) if the bits emitted by the main demodulator correspond to two successive identical patterns, and a signal 0 (or 1) in the opposite case. The auxiliary demodulator incorporates the comparison system for comparison of each modulation state of the signal received, with the preceding modulation state, and emits a signal 1 (or 0) in the event of agreement, and a signal 0 (or 1) in the opposite case. The output of the comparison circuit and the output of the auxiliary demodulator are respectively connected to the inputs of a modulo 2 adder, whose output supplies a counter which registers the required evaluation.

According to another feature, when the modulation is of the transition coding type, the comparison circuit compares the m bits of the pattern with the m bits of the predetermined pattern which corresponds to the "identical state" modulation, instead of the m bits of the preceding pattern.

The above mentioned features of the invention, in addition to others, will be more clearly understood from the following description of embodiments, the said description being made with reference to the accompanying drawings in which.

Figure 1:
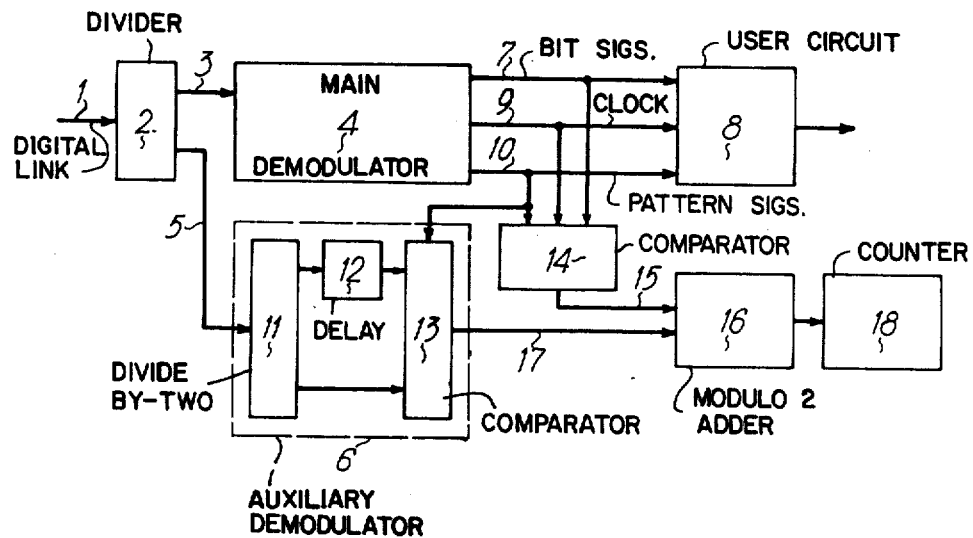
FIG. 1 is a block diagram of an apparatus in accordance with the invention.

In FIG. 1 the reception end of a digital link 1 connected to the input of a power divider 2, such as a 3 dB coupler, whose two outputs are connected respectively to the input 3 of the main demodulator 4 and to the input 5 of an auxiliary demodulator 6. The link 1 transmits digital information in multiple level modulation, as defined above. Each state of modulation corresponds to a pattern or a sub-pattern of m bits. If T is the duration of a bit, each modulation state therefore has a duration equal to mT.

The main demodulator 4 is a standard demodulator adapted to the modulation of the signals appearing on link 1. It is correctly regulated and emits at its signal output 7 a series of bits. In principle identical to that which served to modulate the carrier of the link 1, which is transmitted to the standard user circuits 8. In addition, the demodulator 4 emits from its output 9, standard synchronization clock signal of bits to the circuits 8, and, at its output 10, a pattern synchronization signal the period of which is, of course, n times longer than the signal from 9.

The auxiliary demodulator 6 is a circuit whose function is to store the signal applied to its input 5 during the period of one pattern in order to compare it with the following signal. For this purpose, as is shown in the example in FIG. 1, the auxiliary demodulator 6 may include, as shown at 11, a divide by two circuit, whose first output is linked to the input of a delay line 12, whose delay is equal to mT, and whose second output is linked to the first input of a comparator 13. The output of the delay line 12 is linked to the second input of the comparator 13. The comparator 13 emits a logical signal 1 when the signals applied to its two inputs are identical and a logical signal 0 in the opposite case. The comparator 13 is controlled by a signal emitted from the output 10 of the main demodulator 4.

The apparatus in the invention also includes a comparator 14 whose signal input is connected to the output 7 of block 4, whose bit clock input is connected to the output 9 and whose pattern clock input is connected to the output 10. The comparator 14 compares the m bits of a pattern emitted by the demodulator 4 with the m bits of the following pattern. At its output 15, the comparator 14 emits a logical signal 1, if the m bits of two successive patterns are all identical, and a logical signal 0 in the opposite case.

The output 15 of the comparator 14 is connected to the first input of a modulo 2 adder 16 whose second input is connected to the output of the auxiliary demodulator 6. The output of the adder 16 is connected to the input of a counter 18 which registers the error rate.

Thus, instead of comparing the outputs of the main demodulator and the auxiliary demodulator, bit by bit, as in the apparatus of the prior art, in the apparatus of this invention these outputs are compared pattern by pattern, on the one hand, and modulation state by modulation state on the other hand, and an impulse is emitted each time the comparison result differs between the two demodulators 4 and 6. This impulse is counted by the counter 18.

If one is limited to the first order, that is to the error rates $\tau$, such as $m^{96} < < 1$, included in the counting by counter 18 are the successive identical patterns and those which only differ by one bit out of m bits when this bit specifically causes a decision error in one of the two demodulators 4 and 6.

In fact, in the first order, two patterns of m bits will be considered identical for one demodulator and different for the other in the two types of cases which follow:

1 '—the two patterns are in fact identical but one of the two demodulators is mistaken over one of the 2 m bits. The probability of this occurring is equal to the probability of two identical patterns occurring, i.e. $1/2^m$, multiplied by the probability of one error in 2 m bits in one or other of the demodulators, i.e. $2m(\tau 1 + \tau 2)$, or alternatively a total of $$(1/2^m) \times 2m(\tau 1 + \tau 2) \tag{1}$$

where $\tau 1$ is the real error rate at the output of the main demodulator 4 and $\tau 2$ the real error rate at the output of the auxiliary demodulator 6.

2 —the two patterns differ by a single bit in the m bits of one pattern and one or the other of the demodulators is mistaken over this bit in one or other of the two successive patterns. The probability of this occurring is equal to the probability of having a difference of only one bit in two patterns, i.e., $1/2^m$, multiplied by the number of bits in one pattern, i.e., m, multiplied by the probability of an error of one bit in one of the patterns in one or other of the demodulators, i.e., $2(\tau 1 + \tau 2)$, or alternatively a total of $$(1/2^m) \times m \times 2(\tau 1 + \tau 2) \tag{2}$$

By adding the expressions (1) and (2), the probability of counting errors in the counter 18 for the 2m bits transmitted during the two patterns is obtained. That is:

$$(2m/2^{m-1})(\tau 1 + \tau 2)$$

or for one bit transmitted, which represents the estimate of the bit error rate (TEEB):

$$(1/2^{m-1})(\tau 1 + \tau 2) \qquad (3)$$

Thus m being known, it is possible to determine $\tau 1 + \tau 2$ from the contents of counter 18.

By using a comparison bit by bit as described in the French Patent Application No. 76 08288 (now U.S. Pat. No. 4,091,240) mentioned above, $\tau 1 + \tau 2$ can be obtained directly. It appears therefore that the apparatus in the invention only seems to give this value with the reduction factor $1/2^{m-1}$. However, as shown notably in the technical article by B. J. Leon and others, quoted in the introduction, it is possible to connect $\tau 1$ to $\tau 2$ and, by suitably determining the auxiliary demodulator 6, it is possible to obtain, as in the patent application above, an amplification effect on the error rate $\tau 1$ to be evaluated, which allows compensation to be made for the reduction factor mentioned above or even greater accuracy to be obtained.

As the comparison by patterns of m bits relates in effect to the successive modulation states, the apparatus in the invention allows for an auxiliary demodulator with a very simple structure, which represents a considerable improvement over apparatus of the prior art.

Figure 2:
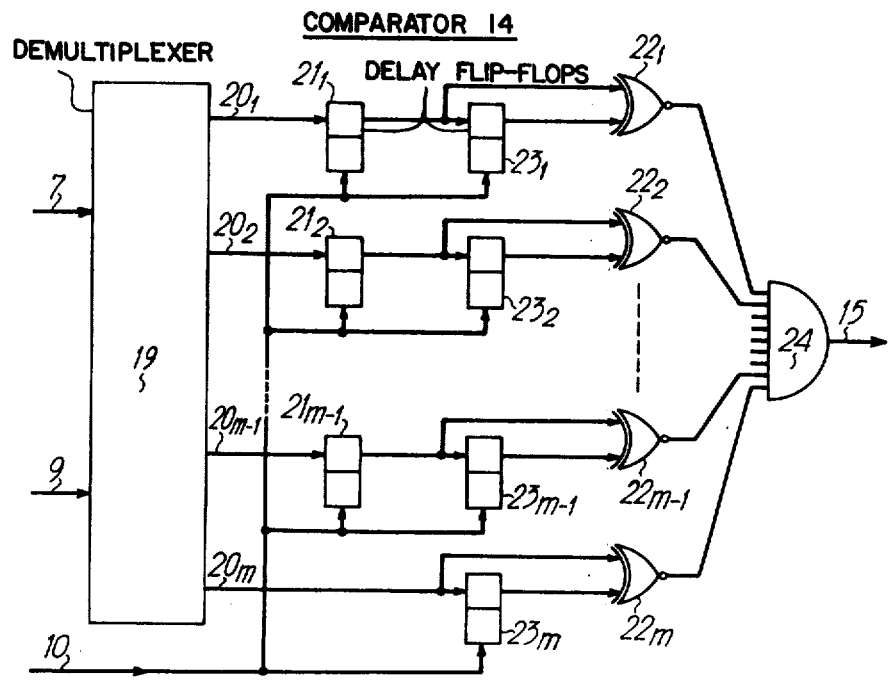
FIG. 2 is a block diagram of a comparison circuit for use in the apparatus in FIG. 1.

FIG. 2 shows, in the form of a schematic block diagram, an example of the comparator 14 of FIG. 1. It includes a demultiplexer 19 which distributes to its outputs $20_1$ to $20_m$ the bits which are applied to it in series from wire 7. The operation of demultiplexer 19 is standard and is controlled by the bit clock signals originating from wire 9 and by the pattern synchronization signal originating from wire 10. The outputs $20_1$ to $20_{m-1}$ of demultiplexer 19 are connected respectively to the signal inputs of circuits "point D" or delay flip-flops $21_1$ to $21_{m-1}$. The circuits $21_1$ to $21_{m-1}$ have their control inputs connected to line 10 and their outputs connected respectively, on the one hand, to the first inputs of standard logical circuits $22_1$ to $22_{m-1}$ and, on the other hand, to the signal inputs of circuits "point D" $23_1$ to $23_{m-1}$. The output $20_m$ of demultiplexer 19 is connected on the one hand, to the first input of a logical circuit $22_m$ and, on the other hand, to the input of a circuit "point D" $23_m$. The outputs of the circuits $23_1$ to $23_m$ are connected respectively to the second inputs of the logical circuits $22_1$ to $22_m$ whose outputs are connected to the m inputs of an AND gate 24. The circuits $23_1$ to $23_m$ have their control inputs connected to the line 10.

The delay flip-flop circuits retain in their memory the signals applied to them, in order to emit them when their command inputs are activated. The logical circuits $22_1$ to $22_m$ determine the symmetrical difference of the signals applied to their inputs, and effect an inversion.

If the bits of a pattern applied by wire 7 to demultiplexer 19, which distributes them to their outputs, are considered, they are stored respectively one after the other, except for the mth, in the circuits $21_1$ to $21_{m-1}$. At the point mT in the pattern, the bits in the pattern are simultaneously emitted by these circuits, the mth passing via the output $20_m$, then they are simultaneously applied to the first inputs of the circuit $22_1$ to $22_m$ and to the circuits $23_1$ to $23_m$, which, at the same time, emit the bits which they have stored in the memory, that is, those of the previous pattern. Therefore, in each circuit, $22_1$ to $22_m$, the bits of two successive patterns are compared two by two and each of these circuits emits a logical signal 1 when the two bits applied to it are identical, and a logical signal 0 in the opposite case. The gate 24 emits a 1 if all of its inputs are at 1, that is if the successive patterns are identical, and a 0 in every other case.

Figure 3:
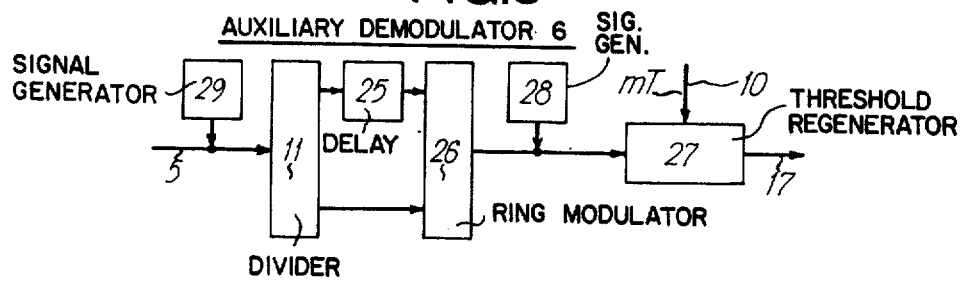
FIG. 3 is a block diagram of an auxiliary demodulator for use in the apparatus in FIG. 1.

FIG. 3 shows an example of the auxiliary demodulator 6 of FIG. 1. As in FIG. 1 the input 5 supplies a power divider 11 of which one output is connected to the input of a delay line 25 and the other output to the input of a ring modulator 26 whose other input is connected to the output of delay line 25. The output of the ring modulator 26 is connected to the input of a threshold regenerator 27 which is controlled by the mT pattern synchronization signal originating from wire 10. The output of regenerator 27 constitutes the output 17 of the demodulator. The delay line 25 has a delay equal to mT, to which it adds a phase shift of $k\pi$ to the carrier of the modulation of line 1.

Thus, when two successive modulation states or patterns are identical, the input signals of the ring modulator are in phase or in opposition depending upon the parity of k, which is represented by a high or low amplitude signal at the output of ring modulator 26. Depending on the case in question, the threshold regenerator takes into account whether the amplitude of the applied signal is greater or less than the threshold and emits a logical signal 1 on output wire 17. When the two successive modulation states or patterns are not identical, the input signals of the modulator 26 are out of phase and/or of different amplitudes. The output of modulator 26 then emits a signal of an amplitude which is neither maximum nor zero, whatever k is, that the regenerator 27 interprets as 0.

Figure 4:
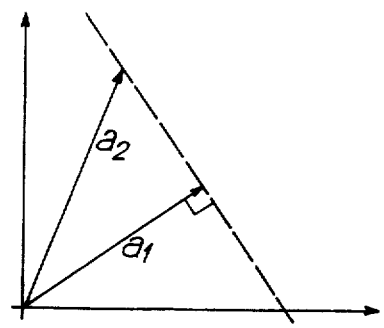
FIG. 4 is a vertical diagram in the complex plane illustrating a case of non-functioning.

The vertical drawing in FIG. 4 shows how the latter result may be in error when there is a mixed change of the modulation state may be represented by a displacement of the extremity of the representative vector $a_2$ from the normal to the starting vector $a_1$. In fact, whatever k is, the regenerator 27 emits signal $a_1$, as for two identical states.

The operation of the auxiliary demodulator 6 (FIG. 4) may be disturbed in order to "amplify" the measurement of the error rate, either by staggering the power division between the two branches by activating the coupler 11, or by staggering the phase shaft introduced by the delay line 25 around $k\pi$, or alternatively by bringing out of phase the clock signal mT or the regenerator threshold 27, either constantly or periodically, for example by connecting to the input of regenerator 27 a generator of alternative signals 28, or by adding noise or a static carrier to the input 5 emitted by a generator 29.

In a variation of the auxiliary demodulator in FIG. 3, for the same delay mT, the delay line 25 causes a phase shift of $\pi/2 + k\pi$, the other circuits remaining unchanged. In this variation, it is possible to detect any change of state, with the exception of those in which the phase is retained to within $k\pi$. This variant may therefore be used for pure phase modulations with staggered jumps or not, but may not be used for pure amplitude modulations. Of course, the operation of the demodulator in this variation may be disturbed as seen previously.

In a second variation of the auxiliary demodulator in FIG. 3 with a phase shift in the delay line 25 of $\pi+2k\pi$, the ring 26 modulator may be replaced by a calculator, such as a 3 dB coupler, together with a detector. Thus, the demodulator carries out a subtraction of the modulated wave between two successive states of modulation and may therefore detect any change of phase state and/or amplitude whether or not the modulation is with staggered jumps. The auxiliary demodulator may then be used for any type of modulation.

It is understood that, in order to use the apparatus in the invention, the auxiliary demodulator must be selected which is best adapted to the modulation used in link 1. If necessary, an appropriate mode of disturbance is selected and a chart is subsequently traced which allows connection of the error rate $\tau2$ of the auxiliary demodulator to the error rate $\tau1$ of the correctly regulated main demodulator, so that it is possible to deduce from the calculation shown by the counter, the error rate $\tau1$.

It must be noted that because of its very simple structure the auxiliary demodulator, even if it is not disturbed voluntarily, may have a very high error rate $\tau2$ in relation to $\tau1$ which allows an amplification effect to be obtained on the error rate $\tau1$ to be evaluated.

Figure 5:
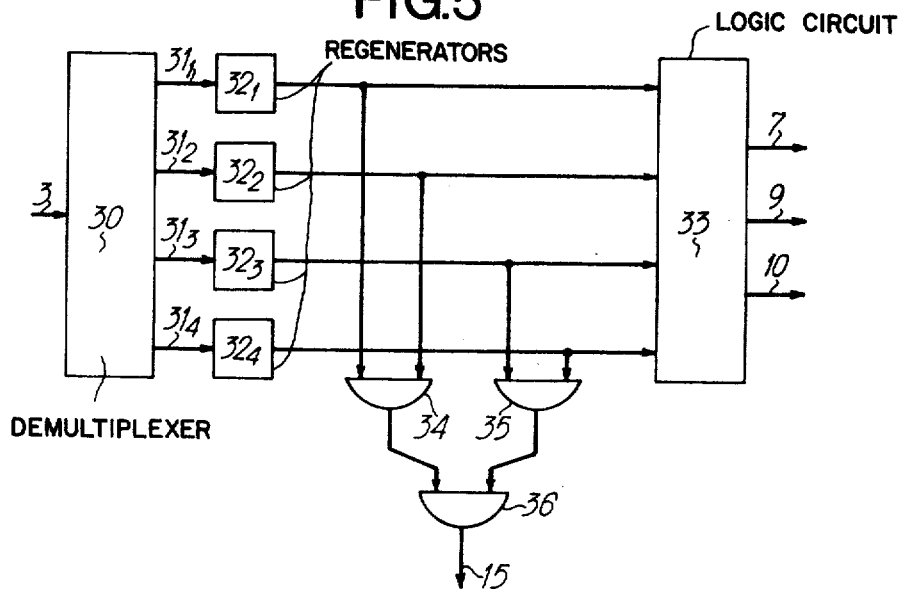
FIG. 5 is a block diagram of a variation of the apparatus in FIG. 1.

FIG. 5 shows a variation of the apparatus in FIG. 1 where the main demodulator is a differential demodulator. The main demodulator in FIG. 5 is provided for in the event of a modulation of 16 states, which corresponds to patterns of 4 bits. It includes a demultiplexer 30 equipped with 4 outputs $31_1$ to $31_4$, supplying respectively the standard regenerators $32_1$ to $32_4$ whose outputs are connected to 4 inputs of the standard logical circuit 33 which regenerates the output signal according to the decisions of each of the regenerators $32_1$ to $32_4$ and to the law of modulation used.

This standard diagram of a differential demodulator is supplemented by AND gates 34 to 36, each with 2 inputs. The first input of the gate 34 is connected to the output of $32_1$ and its second input to the output of $32_2$. The first input of the gate 35 is connected to the output of $32_3$ and its second input to the output of $32_4$. The first input of gate 36 is connected to the output of gate 34 and its second input to the output of gate 35.

Assuming that the regenerators $32_1$ to $32_4$ each emit a logical signal 1 when partial differential demodulation is carried out on two successive identical states, the AND gate 36 emits, in this case, a 1, but a 0 in every other case. It appears therefore that the gates 34 to 36 replace the comparator of the FIG. 3 by using only very few components.

On the other hand, when the modulation of the digital link 1 is of the type coded by transition, the comparator 14 of FIG. 1, instead of comparing the m bits of a pattern emitted by 4 with the m bits of the previous pattern, compares them with the pattern corresponding to the identical state of modulation. In the example of a comparator in FIG. 2 the second inputs of the circuits $22_1$ to $22_m$ are not then connected to the outputs $23_1$ to $23_m$, but to sources of predetermined potential representing the identical state. The circuits $23_1$ to $23_m$ then become unnecessary.

Although the principles of the present invention have been described above in relation to particular examples, it must be understood that the said description has only been used as an example and does not limit the scope of the invention.

I claim:

1. Apparatus for the evaluation of an error rate of bits transmitted over a digital link according to a multiple level modulation process, said apparatus including a main and regulated demodulator having an input and an auxiliary demodulator for detecting disturbances and having an input, the respective inputs of the main and auxiliary demodulators being connected in parallel to the receiving end of the digital link, said main demodulator normally providing an output signal responsive to signals received over said link, said auxiliary demodulator being operated to change said normal output responsive to error conditions, the apparatus further including first comparison circuit means for comparing m bits of each bit pattern with m bits of the preceding bit pattern and for giving a first binary signal if the two compared bit patterns from said output of the main demodulator are identical to each other and for giving a second binary signal if the two compared bit patterns are not identical to each other, and second comparison circuit means incorporated in the auxiliary demodulator for comparing the state of modulation of the received signal with the state of modulation of the preceding signal and for giving a first binary signal in the event of agreement and for giving a second binary signal in the event that said states of modulation are different from each other, modulo 2 adder means, the outputs of the first and second comparison circuit means being respectively connected to the inputs of the modulo 2 adder, and counter means, the output of the modulo 2 adder means being connected to the counter means to register the output thereof.

2. Apparatus for the evaluation of an error rate of bits transmitted over a digital link according to modulation coding of the transitional type, said apparatus including a main and regulated demodulator having an input and an auxiliary demodulator for detecting disturbances and having an input, the respective inputs of the main and auxiliary demodulators being connected in parallel to the receiving end of the digital link, said main demodulator normally providing an output signal responsive to signals received over said link, said auxiliary demodulator being operated to change said normal output responsive to error conditions, the apparatus further including first comparison circuit means for comparing m bits of each bit pattern with m bits of the predetermined bit pattern corresponding to the identical state modulation and for giving a first binary signal if the two compared bit patterns of said output of the main demodulator correspond to each other and for giving a second binary signal if the two compared bit patterns are not identical to each other, and second comparison circuit means incorporated in the auxiliary demodulator for comparing the state of modulation of the received signal with the state of modulation of the preceding signal and for giving a first binary signal in the event of agreement and for giving a second binary signal in the event that said states of modulation are different from each other, modulo 2 adder means, the outputs of the first and second comparison circuit means being respectively connected to the inputs of the modulo 2 adder, and counter means, the output of the modulo 2 adder means being connected to the counter means to register the output thereof.

* * * * *